Patented Dec. 1, 1953

2,661,378

UNITED STATES PATENT OFFICE 2,661,378

PROCESS FOR HALOGEN EXCHANGE

Thomas G. McKenna, Samuel Barney Soloway, Rex E. Lidov, and Julius Hyman, Denver, Colo., assignors, by mesne assignments, to Shell Development Company, Emeryville, Calif., a corporation of Delaware No Drawing. Original application August 21, 1948, Serial No. 45,576. Divided and this application February 10, 1951, Serial No. 210,424

5 Claims. (Cl. 260—648)

This invention relates to processes for exchanging halogen in organic compounds.

Additionally, and more specifically, this invention relates to a new process for the replacement of a bromine in a bromopolychloro hydrocarbon by chlorine to yield a polychloro hydrocarbon possessing a high degree of insecticidal toxicity.

This application is a division of the parent application, Serial No. 45,576, filed August 21, 1948.

One object of this invention is the provision of methods and processes for inexpensively and practically substituting chlorine for bromine in a bromopolychloro hydrocarbon which is itself readily prepared in order to obtain a chlorinated hydrocarbon of greatly enhanced insect toxicity.

Other objects, features, capabilities, and advantages are comprehended by the invention as will later appear and as are inherently possessed thereby.

In a copending application, Serial No. 736,419 (now abandoned) filed March 21, 1947, by one of us (Julius Hyman), the new composition of matter having the empirical formula $C_{10}H_5Cl_7$ is described. This material results when the Diels-Alder adduct produced by the reaction of one mole of hexachlorocyclopentadiene with one mole of cyclopentadiene (for brevity, this adduct will hereinafter be referred to as HCA) is chlorinated. The chlorinated adduct which is thus obtained 1 (or 3a), 4,5,6,7,8,8-heptachloro-3a,4,7,7a - tetrahydro - 4,7 - methanoindene, in which the exact position of the chlorine atom obtained by substitution is not yet unambiguously known and which will hereinafter be referred to as HD, since it is a heptachlorodicyclopentadiene, is an extremely active insect toxicant which results from the substitution of one atom of chlorine for one atom of hydrogen in the original adduct HCA. This active toxicant has now been given the common name "heptachlor." Unfortunately, HD is obtained as one component of a rather complex chlorination reaction mixture from which it can be separated only with difficulty.

In the copending application of Julius Hyman, Serial No. 643,759 filed January 26, 1946, now United States Patent No. 2,519,190 of August 15, 1950, the product obtained by the bromination of the adduct HCA is disclosed (1 (or 3a)-bromo-4,5,6,7,8,8-hexachloro-3a,4,7,7a - tetrahydro - 4,7-methanoindene). This material which will hereinafter be referred to as 1-BrHCA is the result of the substitution of an atom of bromine for an atom of hydrogen in the adduct HCA, and, as disclosed in the copending application, Serial No. 736,419, can be converted to HD by a three-step process therein described. However, as is well known, the economical desirability of manufacturing processes generally decreases with an increasing number of manufacturing steps. While the four-step process here referred to is chemically feasible, it does not represent an economically desirable procedure for producing the compound HD.

We have now found that the bromine of said 1-BrHCA can be replaced by chlorine by relatively simple and inexpensive procedures requiring a minimum of reaction steps and the use of simple and relatively inexpensive reagents and uncomplicated apparatus.

Briefly, the new method which we have discovered comprises reacting 1-BrHCA in a suitable solvent and in the presence of a simple catalyst or combination of catalysts with a chloride ion donor, thus causing the bromine in 1-BrHCA to be replaced by chlorine. The bromine atom thus replaced is subsequently found in the reaction solution either as free bromine or as a bromide ion and is recoverable by known means from that solution for reuse.

The catalysts employed which may be generally classified as Friedel-Crafts catalysts may, for example, be aluminum chloride, ferric chloride and stannic chloride. Other catalysts which may be used and which are claimed in the parent copending application, Serial No. 45,576, filed August 21, 1948, are iodine monochloride, iodine trichloride, iodobenzene dichloride, or any one of a number of many similar compounds.

The solvent most advantageously employed will, of course, vary with the particular catalyst utilized. Thus, reactions in which aluminum chloride, ferric chloride, stannic chloride, etc., are the catalysts involved can most readily be carried out in solution in nitroparaffin or in nitrobenzene. On the other hand, when the reaction is accomplished with catalysts such as the iodine chlorides or iodobenzene dichloride, polyhaloparaffin solvents such as carbontetrachloride, chloroform, tetrachloroethylene, etc., or solvents such as benzene, etc., provide the most advantageous reaction medium. In the latter case, solvents such as paraffinic hydrocarbons, liquid nitroparaffines, and liquid aromatic chlorides can also be used.

The chlorine atom donor best employed also varies with the catalyst which is used to accomplish the reaction. Thus, with catalysts like aluminum chloride, ferric chloride, etc., anhydrous hydrogen chloride can most easily and successfully be used as the chlorine atom donor. With the iodine chlorides, etc., the chlorine for substitution is best obtained either from the catalyst itself or from low concentrations of chlorine, in the presence of an excess, on the molar basis, of free bromine, in the solution obtained by adding chlorine gas thereto as the reaction proceeds, We have also discovered that when the reaction is carried out in solutions of nitrobenzene or nitroparaffin, using metallic chloride catalysts of the Friedel-Crafts type, the rate at which it proceeds is very greatly increased by the presence in the solution of nitrogen dioxide or its dimer, nitrogen tetroxide, added to the solution in the gaseous form. The use of these gases is not required when the catalyst employed is of the iodine chloride type. In general, the reaction proceeds substantially to completion in a time period ranging from about one hour to 100 hours; as is usually the case, the actual time required depends on the specific reactants chosen, the concentrations thereof employed and the temperature at which the reaction is carried out. A temperature in the range from about 10° C. to about 100° C. can successfully be employed: When the Friedel-Crafts type catalyst used is of the metallic chloride type the upper temperature limit can advantageously be restricted to about 50° C.

Despite the superficial complexity of our invention, the same basic principles suffice to elucidate the variety of reactions apparently involved. Thus, while from the foregoing description it might at first seem that a number of different processes which proceed by a number of different reaction paths are involved, the fact is that they are but varying embodiments of the fundaments taught by our invention.

It appears that the bromine in 1-BrHCA is readily labilized by catalysts of the Friedel-Crafts type such as are listed above, and that once so labilized, can be replaced by chloride ions. What is immediately involved, therefore, is an "ionization" of the bromine atom in 1-BrHCA and the consequent immediate establishment of an equilibrium between bromo HCA and HD. The extent to which HD is then finally obtained will depend upon the relative amounts of chloride and bromide ions available in the reaction solution and the means which may be available for reducing the concentration of bromide ion and hence directing the equilibrium toward HD. Now, since the complex negative ions formed with aluminum chloride and similar metal halide catalysts are extremely stable and since the concentration of ionic chloride which can be reached in the types of solvents required for the utilization of the metal halide catalysts is at best limited, these reactions proceed slowly and incompletely unless adequate means for the removal of the liberated bromide ions can be made available. We have found that in the nitro solvents the bromide is made unavailable by virtue of oxidation reactions which go forward in the reacting solutions in which the nitroparaffins act to oxidize the bromide ion to free bromine. We have also found that these reaction rates are greatly increased in the presence of nitrogen dioxide, and its dimer.

On the other hand, with catalysts of the iodine chloride type, the bromide ion is removed from the field of activity in quite another fashion. In these cases, the iodobromides which are formed as a result of the labilizing influence of the catalyst are in contrast to the initial iodochlorides, substantially non-ionic in character. For this reason, the competition between the chloride ion and the bromide ion is decreased or eliminated and the reaction proceeds to completion to the formation of HD with a fair degree of rapidity.

The tendency for free chlorine to add to the double bond of 1-BrHCA or of HD can be minimized or eliminated by the presence of an excess of free bromine which, by holding the chlorine as the weakly combined bromomonochloride prevents its reaction with the aforementioned double bonds but not with the iodine bromide. Hence, in this case, the combined bromine can be oxidized to free bromine and completely removed from the sphere of reaction by means of chlorine with the simultaneous regeneration of the iodine chloride type catalyst.

Inasmuch as the metal halide Friedel-Crafts catalysts are also active in causing the addition of halogens to carbon to carbon double bonds, the use of chlorine as an oxidizing agent to remove bromide ion from the equilibrium mixture formed when catalysts of this type are employed is, of course, substantially precluded.

While we believe that the foregoing constitutes a reasonably exact explanation of the new process which we have discovered, our process is not, of course, to be limited in scope or application by the correctness of the hypotheses herein set forth.

The many ways in which our basic discovery herein disclosed can be applied in practice can best be illustrated by means of examples which show the methods by means of which 1-BrHCA can be converted to HD.

Example I illustrates one method for utilizing the teachings of our invention.

EXAMPLE I

A rapid stream of hydrogen chloride gas was passed for 15 minutes at room temperature into a solution of 150 grams (0.36 mole) of 1-BrHCA and 48 grams (0.36 mole) of aluminum chloride in 225 ml. of nitroethane and the reaction mixture allowed to stand. On the following day the reaction solution was decanted from the large crystals which had separated. Recrystallization of these crystals from methanol yielded 64 grams of HD melting at 91–93°. Upon further standing an additional quantity of crystals separated, which, after recrystallization, amounted to 12 grams, M. P. 95.2–95.8° C. The reaction solution was then cooled by means of a Dry Ice-methanol bath. The crystals which separated were collected and sucked dry and upon recrystallization amounted to 35 grams of product, M. P. 95.2–95.8° C. The total yield of recrystallized product was 85% of the theoretical.

Anal. Calc'd for $C_{10}H_5Cl_7$; Cl, 66.48. Found: Cl, 66.31, 66.54, 66.49.

The reaction solution, stripped of product, was recovered for further use in the process.

Example II shows the use of ferric chloride as the catalyst for effecting the conversion as well as an alternate method for the recovery of the product.

EXAMPLE II

A solution of 4.2 grams (0.01 mole) of 1-BrHCA and 0.01 mole of ferric chloride in 20 ml. of nitroethane was subjected to the continuous passage of hydrogen chloride gas. The effluent gases were passed into water and the solution showed the presence of bromide ion. When after 5 hours the test for bromine was negative, the reaction mixture was decomposed by the addition of water. The organic material was taken up with ethyl ether, the ethereal solution washed with dilute sodium bicarbonate solution and with water and dried over anhydrous sodium sulfate. The residual oil remaining upon removal of the ether was crystallized from methanol and yielded 2.5 grams of product, M. P. 94–95° C.

In Example III the use of nitrobenzene as the reaction solvent is illustrated.

EXAMPLE III

A continuous stream of hydrogen chloride gas was passed through a solution of 20 grams (0.05 mole) of 1-BrHCA and 7 grams (0.05 mole) of aluminum chloride in 55 ml. of nitrobenzene for a period of seven hours. The reaction mixture was then subjected to steam distillation to remove the solvent and the product was recovered by extraction with ethyl ether. Evaporation of the ether left an oil which, upon trituration with methanol, yielded impure product which on one crystallization from methanol melted above 92° C.

In Example IV a modification of the basic invention in which nitrogen tetroxide is utilized is detailed.

EXAMPLE IV

A solution of 6.7 grams (0.05 mole) of aluminum chloride and 2.3 grams (0.25 mole) of nitrogen tetroxide in 80 ml. of nitroethane was saturated with hydrogen chloride gas, 1.2 grams of the latter being absorbed. The mixture was then added to 20 grams (0.05 mole) of 1-BrHCA and the resulting solution allowed to stand at room temperature for twenty hours. The reaction mixture was then mixed with dilute hydrochloric acid and the nitroethane phase was separated. The organic phase thus obtained was dried with anhydrous calcium chloride and the solvent, together with some free bromine, was recovered by distillation in vacuo. Trituration of the residue with methanol yielded 18.2 grams of product melting at 92-93° C.

The further presentation of process modifications can, in the interest of brevity, be best set forth in table form. Table I lists reactants and reaction conditions for many specific embodiments of our novel discovery all of which result in substantially complete conversion of 1-BrHCA to HD. The means employed to recover the desired product are essentially those described in Examples I to IV, both inclusive, with such changes as are required by the fact that in many instances significant amounts of free bromine, iodine and their interaction products are present. These, of course, can be recovered by methods already known to practitioners in this field.

ments of our invention and the suggestions for its further application herein contained are set forth for illustrative purposes only and are, in no sense, to be considered as delineating its scope; its limits are rather to be defined only by the following claims:

It is claimed:

1. The process of converting the mono-bromo derivative resulting from the substitution of a bromine atom for a hydrogen atom of the Diels-Alder adduct obtained by the reaction of one mole of hexachlorocyclopentadiene with one mole of cyclopentadiene to the corresponding chloro derivative, which comprises subjecting the brominated adduct to halogen exchange in a conversion solution chosen from the group consisting of (1) solutions consisting essentially of metal halide Friedel-Crafts catalysts and hydrogen chloride in liquid nitrohydrocarbons, and (2) solutions consisting essentially of metal halide Friedel-Crafts catalysts, hydrogen chloride, nitrogen dioxide and nitrogen tetroxide in liquid nitrohydrocarbons, at temperatures between about 10° C. and 50° C. for time periods of from about 1 hour to 100 hours in order to effect substantially complete conversion of the brominated adduct to the corresponding chlorinated adduct, and isolating the desired chlorinated adduct from the solution.

2. A process according to claim 1, in which the conversion solution consists essentially of aluminum chloride, hydrogen chloride, nitrogen dioxide and nitrogen tetroxide in nitroethane.

3. A process according to claim 1, in which the conversion solution consists essentially of aluminum chloride and hydrogen chloride in a liquid mononitro paraffin.

4. A process according to claim 1, in which the conversion solution consists essentially of ferric chloride and hydrogen chloride in a liquid mononitro paraffin.

5. A process according to claim 1, in which the conversion solution consists essentially of stannic chloride and hydrogen chloride in a liquid mononitro paraffin.

THOMAS G. McKENNA.
SAMUEL BARNEY SOLOWAY.
REX E. LIDOV.
JULIUS HYMAN.

Table I

| Run No. | Moles 1-BrHCA | Solvent | | Catalyst | | Chlorine donor $Cl_2Br_2$, moles | Time, hours | Temp., ° C. |
|---|---|---|---|---|---|---|---|---|
| | | Kind | Moles | Kind | Moles | | | |
| 10 | 1.0 | $CCl_4$ | 1.6 | ICl | 1.5 | | 48 | 20-25. |
| 19 | 0.0358 | $C_6H_6$ | 0.045 | ICl / $ICl_3$ | 0.0358 / 0.0175 | | 65 | 20-25. |
| 30 | 0.0358 | $CCl_4$ | 0.045 | $ICl_3$ | 0.0175 | | 20 | 20-25. |
| 32 | 0.1 | $CCl_4$ | 0.15 | $ICl_3$ | 0.04 | | 4 | 50. |
| B73 | 0.05 | $CCl_4$ | 0.10 | $C_6H_5ICl_2$ | 0.055 | | 24 | 25. |
| B81 | 0.025 | $CCl_4$ | 0.10 | $C_6H_5ICl_2$ | 0.0135 | | 3 | Reflux. |
| 46 | 1.0 | $CCl_4$ | 0.84 | ICl | 0.01 | 0.55-0.75 | 12 | 20-25. |
| 45 | 1.0 | $CCl_4$ | 0.84 | ICl | 0.1 | 0.55-0.75 | 12 | 20-25. |

It is, of course, obvious, that it is not necessary to preform the iodine chloride used. This is substantiated by the fact that the addition of chlorine to a solution containing an excess of iodine, or a small amount of iodine and an excess of bromine gives the same results as are obtained under the conditions more specifically set forth in Table I above.

The various illustrations of specific embodi-

References Cited in the file of this patent

UNITED STATES PATENTS

| Number | Name | Date |
|---|---|---|
| 2,519,190 | Hyman | Aug. 15, 1950 |

OTHER REFERENCES

Chemical Abstracts, vol. 42, cols. 4820-1 (1948), (Abstract of article by Bak.).